(12) United States Patent
Tobij et al.

(10) Patent No.: US 12,484,170 B2
(45) Date of Patent: Nov. 25, 2025

(54) CONSOLE DISPLAY HINGE SYSTEM

(71) Applicant: ROBE lighting s.r.o., Roznov pod Radhostem (CZ)

(72) Inventors: Jean Bert Tobij, London (GB); Josef Valchar, Prostredni Becva (CZ)

(73) Assignee: ROBE lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 19/077,845

(22) Filed: Mar. 12, 2025

(65) Prior Publication Data
US 2025/0294691 A1  Sep. 18, 2025

Related U.S. Application Data

(60) Provisional application No. 63/564,878, filed on Mar. 13, 2024.

(51) Int. Cl.
| | |
|---|---|
| *H05K 5/02* | (2006.01) |
| *F16C 11/04* | (2006.01) |
| *H05B 47/175* | (2020.01) |

(52) U.S. Cl.
CPC ............ *H05K 5/0226* (2013.01); *F16C 11/04* (2013.01); *H05K 5/0221* (2013.01); *H05B 47/196* (2024.01)

(58) Field of Classification Search
CPC ... H05K 5/0221; H05K 5/0226; G06F 1/1681
See application file for complete search history.

(56) References Cited

U.S. PATENT DOCUMENTS

| | | | | |
|---|---|---|---|---|
| 6,266,236 | B1 * | 7/2001 | Ku | G06F 1/1656 361/679.19 |
| 8,032,987 | B2 * | 10/2011 | Oshima | G06F 1/1681 16/376 |
| 8,459,702 | B2 * | 6/2013 | Bourgain | E05B 17/2053 292/42 |
| 9,372,513 | B1 * | 6/2016 | Riddiford | G06F 1/1616 |
| 9,383,777 | B1 * | 7/2016 | Riddiford | G06F 1/1616 |

(Continued)

OTHER PUBLICATIONS

European Extended Search Report; Application No. 25163530.6; Jul. 21, 2025; 10 pages.

*Primary Examiner* — Rockshana D Chowdhury
*Assistant Examiner* — Douglas R Burtner
(74) *Attorney, Agent, or Firm* — Conley Rose, P.C.; Brooks W Taylor (57) ABSTRACT

A display hinge system includes a latching hinge and a friction hinge. The latching hinge includes a latching hinge moulding with first and second toothed locking plates, and a latch lever mechanism configured to move the first toothed locking plate toward and away from the second toothed locking plate. In one configuration, the first toothed locking plate does not engage the second toothed locking plate and the display hinge system is free to rotate. In another configuration, the first toothed locking plate engages the second toothed locking plate and prevents rotation of the display hinge system. The friction hinge includes a friction hinge moulding, a friction hinge cap, and a torque hinge. The torque hinge has a first part mechanically coupled to the friction hinge moulding and a second part mechanically coupled to the friction hinge cap. The friction hinge is configured to resist rotation of the display hinge system.

18 Claims, 6 Drawing Sheets

(56) References Cited

U.S. PATENT DOCUMENTS

| | | | |
|---|---|---|---|
| 9,506,281 B1 | 11/2016 | Zaloom | |
| 9,823,631 B1* | 11/2017 | Loo | G06F 1/1616 |
| 11,971,130 B2* | 4/2024 | Degner | F16M 11/2092 |
| 12,276,373 B1* | 4/2025 | Naderzad | F16M 11/041 |
| 12,313,114 B2* | 5/2025 | Huang | F16C 11/04 |
| 2002/0044411 A1* | 4/2002 | Iredale | G06F 1/1616 |
| | | | 361/679.05 |
| 2003/0226237 A1 | 12/2003 | Johnson | |
| 2005/0046374 A1* | 3/2005 | Ogawa | G06F 1/1616 |
| | | | 318/614 |
| 2009/0031531 A1 | 2/2009 | Chang et al. | |
| 2009/0059038 A1* | 3/2009 | Seakins | H04N 1/19594 |
| | | | 348/240.99 |
| 2010/0321882 A1 | 12/2010 | Tracy et al. | |
| 2011/0047750 A1* | 3/2011 | Novin | F16F 1/14 |
| | | | 16/297 |
| 2012/0217855 A1* | 8/2012 | Chen | G06F 1/1624 |
| | | | 312/323 |
| 2017/0010631 A1 | 1/2017 | Fan et al. | |
| 2017/0122018 A1* | 5/2017 | Huang | E05D 11/087 |
| 2020/0080357 A1* | 3/2020 | Lin | G06F 1/1681 |
| 2020/0329574 A1* | 10/2020 | Lee | H04M 1/0216 |
| 2022/0326731 A1* | 10/2022 | Degner | H05K 5/0226 |
| 2023/0124154 A1* | 4/2023 | Huang | H05K 5/0226 |
| | | | 361/807 |
| 2024/0102604 A1* | 3/2024 | Cox | F16M 11/18 |
| 2025/0169002 A1* | 5/2025 | Wu | G06F 1/1681 |

* cited by examiner

CONSOLE DISPLAY HINGE SYSTEM

CROSS-REFERENCE TO RELATED APPLICATIONS

This application claims priority to U.S. Provisional Application No. 63/564,878 filed Mar. 13, 2024 by Jean Bert Tobij, et al., entitled "Console Display Latch", which is incorporated by reference herein as if reproduced in its entirety.

TECHNICAL FIELD OF THE DISCLOSURE

The disclosure generally relates to lighting control consoles, and more specifically to a hinge system for a display on such a console.

BACKGROUND

Lighting control consoles for use in the entertainment and architectural lighting markets may include display screens that are used to show information to an operator about the lighting configuration and outputs. Such lighting control consoles are often installed on a temporary basis for a theatrical show, event, concert, or studio recording and benefit from a capability to be set up and packed away rapidly. The display screens may be large and benefit from being protected during transit and handling, while allowing quick deployment for use. Such lighting control consoles may be used in theatres, television studios, concerts, theme parks, night clubs and other venues.

BRIEF DESCRIPTION OF THE DRAWINGS

For a more complete understanding of this disclosure, reference is now made to the following brief description, taken in conjunction with the accompanying drawings in which like reference numerals indicate like features.

SUMMARY

In a first embodiment, a display hinge system includes a latching hinge and a friction hinge and is configured to rotatably couple a display panel to a control panel. The latching hinge includes a latching hinge moulding that is fixedly coupled to the control panel, a first toothed locking plate that is translatably and non-rotatably mounted to the latching hinge moulding, a second toothed locking plate that is fixedly coupled to the display panel, and a latch lever mechanism that is mechanically coupled to the first toothed locking plate. The latch lever mechanism is configured to move the first toothed locking plate toward and away from the second toothed locking plate. In a first configuration of the latch lever mechanism, teeth of the first toothed locking plate do not engage the teeth of the second toothed locking plate and the display panel is free to rotate relative to the control panel. In a second configuration of the latch lever mechanism, the teeth of the first toothed locking plate engage the teeth of the second toothed locking plate and prevent the display panel from rotating relative to the control panel. The friction hinge includes a friction hinge moulding that is fixedly coupled to the control panel, a friction hinge cap that is fixedly coupled to the display panel, and a torque hinge. The torque hinge has a first part and a second part, the first part mechanically coupled to the friction hinge moulding and the second part mechanically coupled to the friction hinge cap. The friction hinge is configured to resist rotation of the display panel relative to the control panel.

In a second embodiment, a lighting console includes a control panel and a display panel. The display panel is rotatably coupled to the control panel by a display hinge system that includes a latching hinge and a friction hinge. The latching hinge includes a latching hinge moulding that is fixedly coupled to the control panel, a first toothed locking plate that is translatably and non-rotatably mounted to the latching hinge moulding, a second toothed locking plate that is fixedly coupled to the display panel, and a latch lever mechanism that is mechanically coupled to the first toothed locking plate. The latch lever mechanism is configured to move the first toothed locking plate toward and away from the second toothed locking plate. In a first configuration of the latch lever mechanism, teeth of the first toothed locking plate do not engage the teeth of the second toothed locking plate and the display panel is free to rotate relative to the control panel. In a second configuration of the latch lever mechanism, the teeth of the first toothed locking plate engage the teeth of the second toothed locking plate and prevent the display panel from rotating relative to the control panel. The friction hinge includes a friction hinge moulding that is fixedly coupled to the control panel, a friction hinge cap that is fixedly coupled to the display panel, and a torque hinge. The torque hinge has a first part and a second part, the first part mechanically coupled to the friction hinge moulding and the second part mechanically coupled to the friction hinge cap. The friction hinge is configured to resist rotation of the display panel relative to the control panel.

DETAILED DESCRIPTION

Preferred embodiments are illustrated in the figures, like numerals being used to refer to like and corresponding parts of the various drawings.

Figure 1:
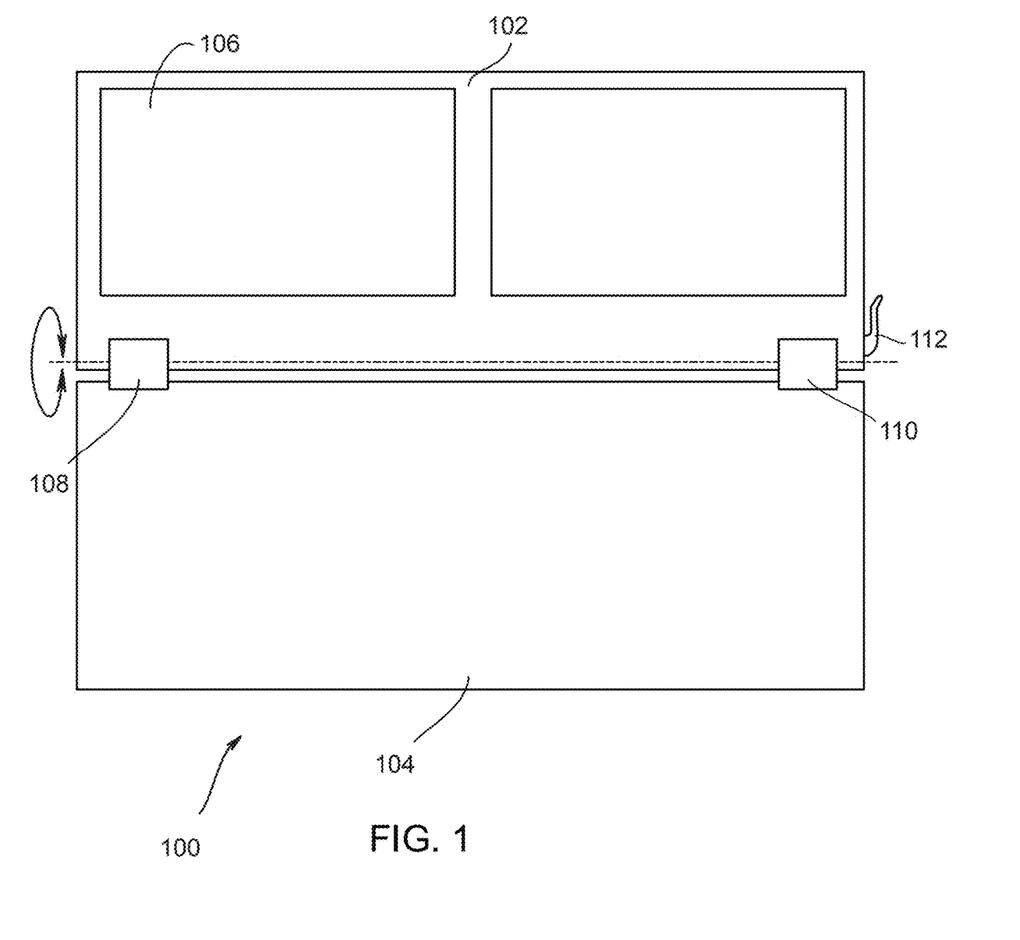
FIG. 1 presents an overall schematic view of a lighting console according to the disclosure.

FIG. 1 presents an overall schematic view of a lighting console 100 according to the disclosure. The lighting console 100 includes a control panel 104 and a display panel 102 comprising displays 106. The control panel 104 may include additional displays, switches, encoders, buttons, knobs and other control devices (not shown). The displays 106 may be liquid crystal display (LCD) video displays, light-emitting diode (LED) displays, organic light-emitting diode (OLED) displays or other display types. For transport and handling, the display panel 102 is rotatably coupled to the control panel 104 by a display hinge system comprising friction hinge 108 and latching hinge 110, providing rotation along the axis of rotation indicated in FIG. 1. The latching hinge 110 is controlled by a latch lever 112. The display panel 102 may be moved into any desired position from a closed position (where the displays 106 are positioned adjacent to the control panel 104), an open position (where the displays 106 are rotated away from the control panel 104), or any position between closed and open. The latching hinge 110 and latch lever 112 are configured to secure the display panel 102 in any position from closed to open.

Figure 2:
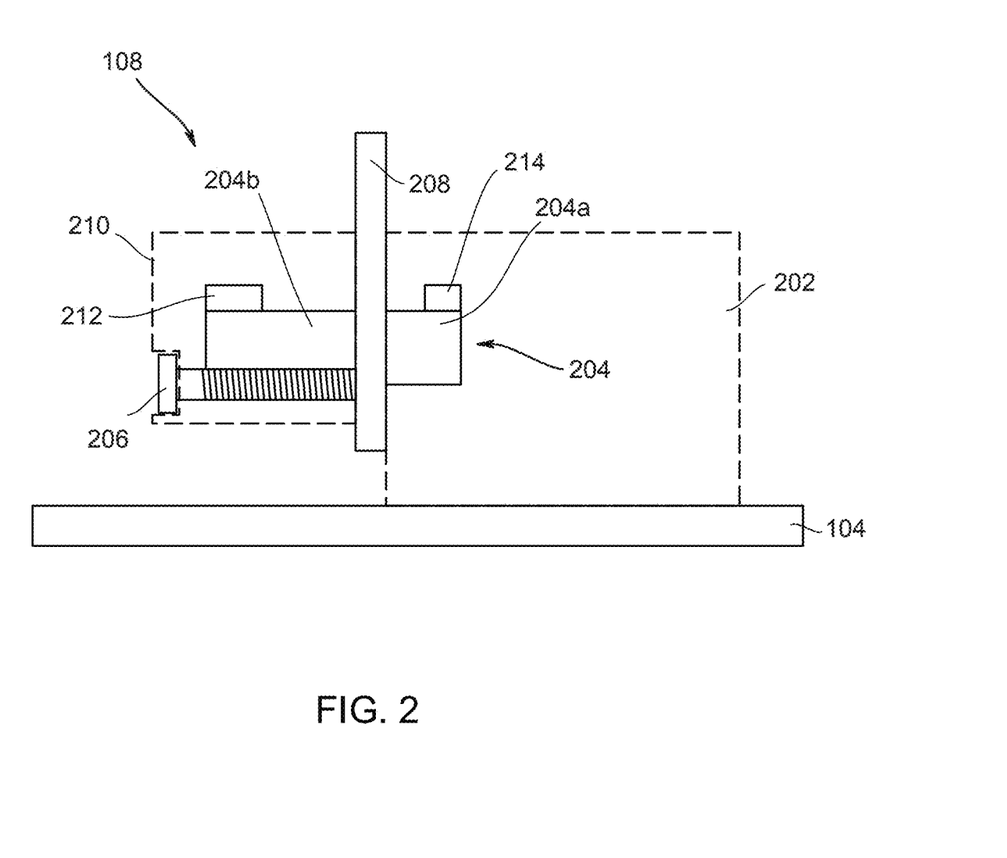
FIG. 2 presents a schematic view of a friction hinge of the lighting console of FIG. 1.

FIG. 2 presents a schematic view of the friction hinge 108 of the lighting console 100 of FIG. 1. The friction hinge 108 comprises a friction hinge moulding 202, a friction hinge cap 210, and a torque hinge 204. The torque hinge 204 is mechanically coupled to the friction hinge moulding 202 and the friction hinge cap 210. The friction hinge moulding 202 is fixedly coupled to the control panel 104. The torque hinge 204 comprises a first part 204a that includes a first tab 214 (or other radial extension) and a second part 204b that includes a second tab 212. The torque hinge 204 is configured as a cylinder, wherein the first part 204a comprises a first end of the cylinder and the second part 204b comprises a second, opposite end of the cylinder. The torque hinge 204 is configured to resist rotation of the first part 204a relative to the second part 204b in either direction of rotation. The first part 204a is mechanically coupled to the friction hinge moulding 202 and second part 204b is mechanically coupled to the friction hinge cap 210.

The friction hinge moulding 202 is mechanically coupled to the first part 204a of the torque hinge 204. The friction hinge moulding 202 and the first part 204a are prevented from rotating relative to each other by the tab 214, which is constrained within a slot (or other recess) in the friction hinge moulding 202. The friction hinge cap 210 is fixedly coupled to the display panel 102 via a display panel arm 208, which is fixedly coupled to the display panel 102. The friction hinge cap 210 and the display panel arm 208 are coupled by a screw 206 (or a plurality of screws) that passes through the friction hinge cap 210 and is received in threaded holes in the display panel arm 208. The friction hinge cap 210 is mechanically coupled to the second part 204b of the torque hinge 204. The friction hinge cap 210 and the second part 204b are prevented from rotating relative to each other by the tab 212 which is constrained within a slot (or other recess) in the friction hinge cap 210. The display panel 102 and the control panel 104 are thus rotatably coupled through the friction hinge 108. The friction hinge 108 is configured to resist or prevent rotation of the display panel 102, even when the latching hinge 110 is in an unlatched configuration.

Figure 3:
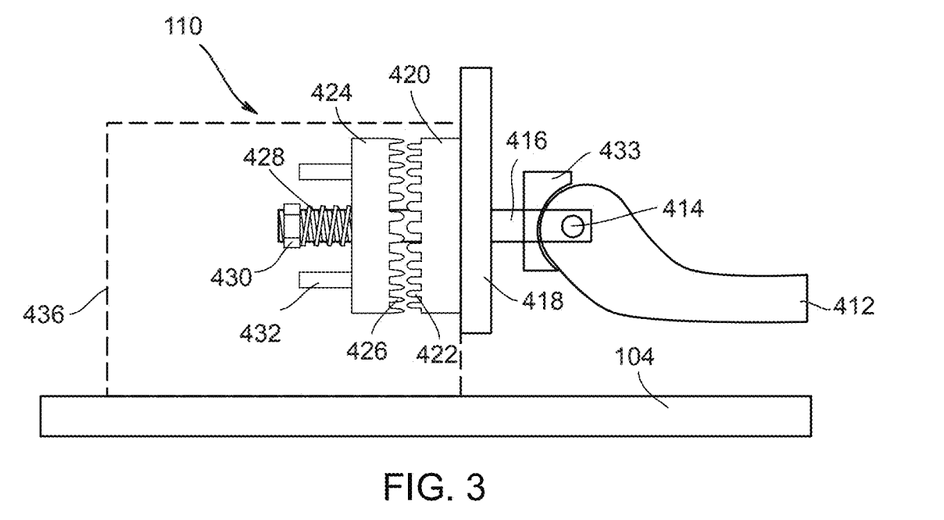
FIG. 3 presents a schematic view of a latching hinge of the lighting console of FIG. 1 in a first, unlocked, position.

FIG. 3 presents a schematic view of a latching hinge 110 of the lighting console 100 of FIG. 1 in a first, unlocked, position. A first toothed locking plate 424 comprising teeth 426 is translatably and non-rotatably mounted via pins 432 that are fixedly coupled to a latching hinge moulding 436. The latching hinge moulding 436 is fixedly coupled to the control panel 104. The first toothed locking plate 424 is free to move axially along the pins 432 and a shaft 416. The pins 432 are configured to prevent the first toothed locking plate 424 from rotating relative to the latching hinge moulding 436.

The shaft 416 is threaded at one end and fitted with a corresponding nut 430 that captures an override spring 428. The override spring 428 is configured to apply a first force to the first toothed locking plate 424, biasing it toward a second toothed locking plate 420. A separation spring 434 (shown in FIG. 6) between the first and second toothed locking plates 424 and 420 is configured to apply a second force to the first toothed locking plate 424, biasing it away from the second toothed locking plate 420 when the shaft 416 moves the nut 430 away from the second toothed locking plate 420.

The second toothed locking plate 420 comprises teeth 422, and is fixedly coupled to a display panel arm 418, which is fixedly coupled to the display panel 102. The second toothed locking plate 420 does not move axially along the shaft 416, and the shaft 416 moves within the second toothed locking plate 420. The shaft 416 passes through the first toothed locking plate 424, the second toothed locking plate 420, the display panel arm 418, and a latch lever seat 433. The shaft 416 is retained in a latch lever 412 by a hinge pin 414.

The latch lever seat 433 is fixedly coupled to the display panel arm 418, but is shown in FIG. 3 as separated therefrom to clarify the illustration of the latching hinge 110. The latch lever seat 433 provides a curved seat surface that a curved portion of the latch lever 412 is configured to mate with. The curved portion bears against the curved seat surface as the latch lever 412 rotates around the hinge pin 414. The hinge pin 414 is a pivot that is positioned asymmetrically in the latch lever 412 so that, as the latch lever 412 rotates, the hinge pin 414 moves relative to the latch lever seat coaxially along a long axis of the shaft 416, thereby moving the shaft 416 relative to the latch lever seat 433. In the configuration discussed below with reference to FIG. 4, the latch lever 412 is in a position where the shaft 416 is pushed to the left, away from the latch lever seat 433 and the latch lever 412. As the shaft 416 moves to the left, the separation spring 434 biases the first and second toothed locking plates 424 and 420 apart, causing the teeth 422 and 426 to disengage and allow relative rotation between the first and second toothed locking plates 424 and 420. As such, the latch lever seat 433, the latch lever 412, and the shaft 416 comprise a latch lever mechanism configured to move the first toothed locking plate 424 toward and away from the second toothed locking plate 420.

Figure 4:
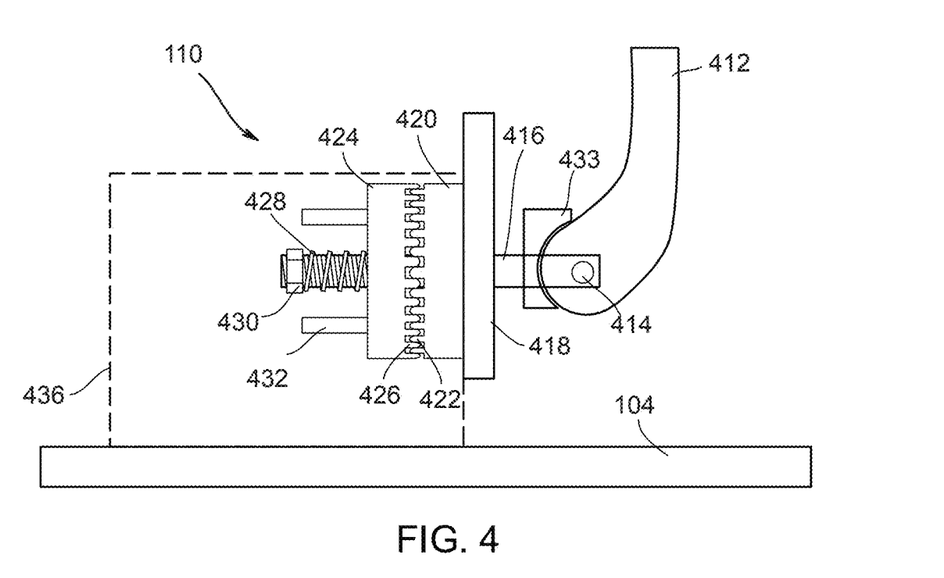
FIG. 4 presents a schematic view of the latching hinge of FIG. 3 in a second, locked, position.

FIG. 4 presents a schematic view of the latching hinge 110 of FIG. 3 in a second, locked, position. In the configuration shown in FIG. 4, the latch lever 412 is in a position where the shaft 416 is pulled to the right, towards the latch lever seat 433 and the latch lever 412. As the shaft 416 moves to the right, the separation spring 434 is compressed and the teeth 426 move to engage the teeth 422 and prevent relative rotation between the first and second toothed locking plates 424 and 420. Because the pins 432 prevent the first toothed locking plate 424 from rotating relative to the latching hinge moulding 436, the engagement of the teeth 426 with the teeth 422 prevents rotation of the display panel arm 418 (and the display panel 102) relative to the control panel 104.

Figure 5:
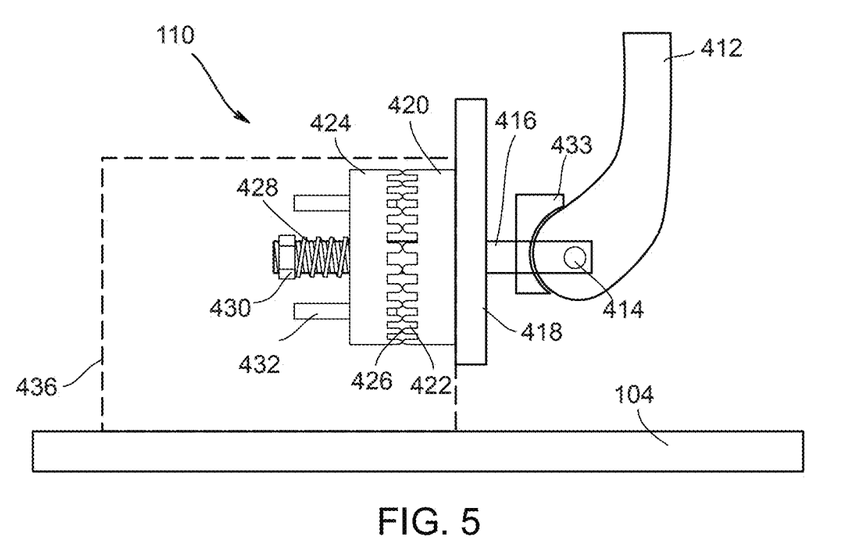
FIG. 5 presents a schematic view of the latching hinge of FIG. 3 in a third position.

FIG. 5 presents a schematic view of the latching hinge 110 in a third configuration. The third configuration is a spring override configuration. In the third configuration, a user is attempting to move the display panel 102 without first unlocking the latching hinge 110. When the user applies sufficient force to the display panel 102, the first toothed locking plate 424 is configured to move along the shaft 416, overriding the override spring 428 of the latching hinge 110. Such a capability reduces the likelihood of damage to the system if excessive force is applied to the display panel 102.

In FIG. 5, the latch lever 412 is in the second configuration, however an outside force is being applied to the display panel 102 (e.g., by a user) in an attempt to move the display panel 102 without first unlocking the latching hinge 110. The teeth 422 and 426 are rounded, tapered, or otherwise shaped (or configured) to convert a rotational torque applied to the latching hinge 110 by such an outside force into an axial force in a direction that compresses the override spring 428 and moves the first toothed locking plate 424 away from the second toothed locking plate 420. When the outside force reaches a sufficient level, the override spring 428 is compressed sufficiently to allow the teeth 422 and 426 to pass each other and the toothed locking plates 424 and 420 to rotate relative to each other. This is the configuration shown in FIG. 6.

Figure 6:
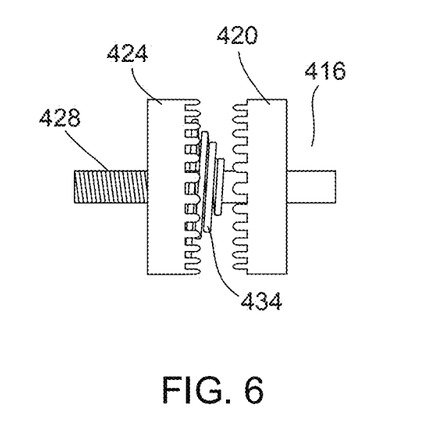
FIG. 6 presents a schematic view of the toothed locking plates of the latching hinge of FIG. 3.

FIG. 6 presents a schematic view of the toothed locking plates 420 and 424 of the latching hinge 110. The toothed locking plates 420 and 424 are shown separated more than in normal operation so that the separation spring 434 can be seen. The separation spring 434 contacts the second toothed locking plate 420 at a first end and the first toothed locking plate 424 at a second end, and biases the first and second toothed locking plates 424 and 420 apart, causing them to separate when the unlocking movement of the latch lever 412 causes the shaft 416 to move the nut 430 away from the second toothed locking plate 420.

Figure 7:
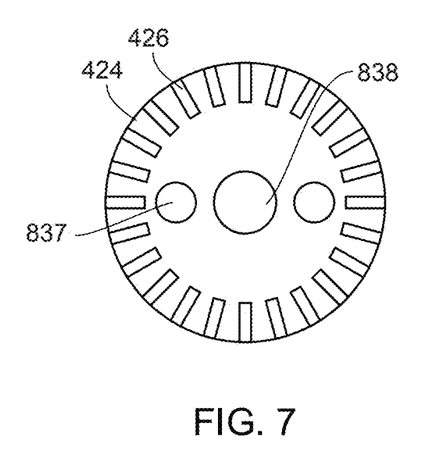
FIG. 7 presents a schematic view of a toothed locking plate of a latching hinge of a lighting console according to the disclosure.

FIG. 7 presents a schematic view of the first toothed locking plate 424 of the latching hinge 110. The first toothed locking plate 424 includes teeth 426. In some embodiments, the teeth 426 are at 6 degree spacings around the first toothed locking plate 424. The first toothed locking plate 424 also includes clearance apertures 837 to receive the pins 432 and a clearance aperture 838 to receive the shaft 416. The pins 432 and the clearance apertures 837 are configured to prevent the first toothed locking plate 424 from rotating relative to the latching hinge moulding 436.

Figure 8:
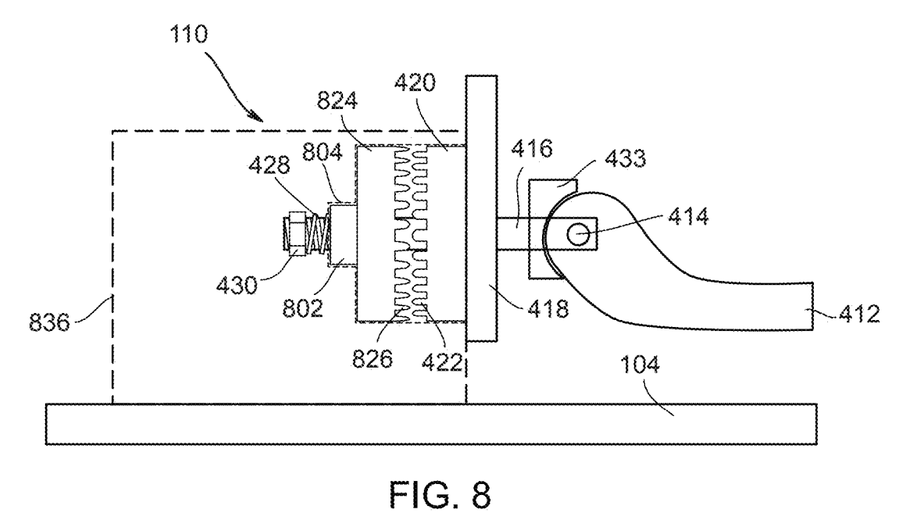
FIG. 8 presents a schematic view of a second embodiment of a latching hinge according to the disclosure in a first, unlocked, position.

FIG. 8 presents a schematic view of a second embodiment of a latching hinge 810 according to the disclosure in a first, unlocked, position. A first toothed locking plate 824 comprises teeth 826 and a bar 802. The first toothed locking plate 824 is translatably mounted to the shaft 416. The bar 802 engages in a matching slot 804 of a latching hinge moulding 836 and prevents the first toothed locking plate 824 from rotating relative to the latching hinge moulding 836. The latching hinge moulding 836 is fixedly coupled to the control panel 104. The first toothed locking plate 824 is free to move axially along the shaft 416 with the bar 802 sliding into and out of the slot 804. Thus, the first toothed locking plate 824 is translatably and non-rotatably mounted to the latching hinge moulding 836.

As described with reference to FIG. 3, the shaft 416 is threaded at one end and the nut 430 captures the override spring 428 on the shaft 416. The override spring 428 is configured to apply a first force to the first toothed locking plate 824, biasing it toward the second toothed locking plate 420. The separation spring 434 (not shown in FIG. 8) between the first and second toothed locking plates 424 and 420 is configured to apply a second force to the first toothed locking plate 424, biasing it away from the second toothed locking plate 420 when the shaft 416 moves the nut 430 away from the second toothed locking plate 420.

As described with reference to FIG. 3, the second toothed locking plate 420 comprises teeth 422, and is fixedly coupled to the display panel arm 418, which is fixedly coupled to the display panel 102. The second toothed locking plate 420 does not move axially along the shaft 416, and the shaft 416 moves within the second toothed locking plate 420. The shaft 416 passes through the first toothed locking plate 424, the second toothed locking plate 420, the display panel arm 418, and the latch lever seat 433. The shaft 416 is retained in the latch lever 412 by the hinge pin 414. As described with reference to FIG. 3, the latch lever seat 433, the latch lever 412, and the shaft 416 comprise a latch lever mechanism configured to move the first toothed locking plate 824 toward and away from the second toothed locking plate 420.

Figure 9:
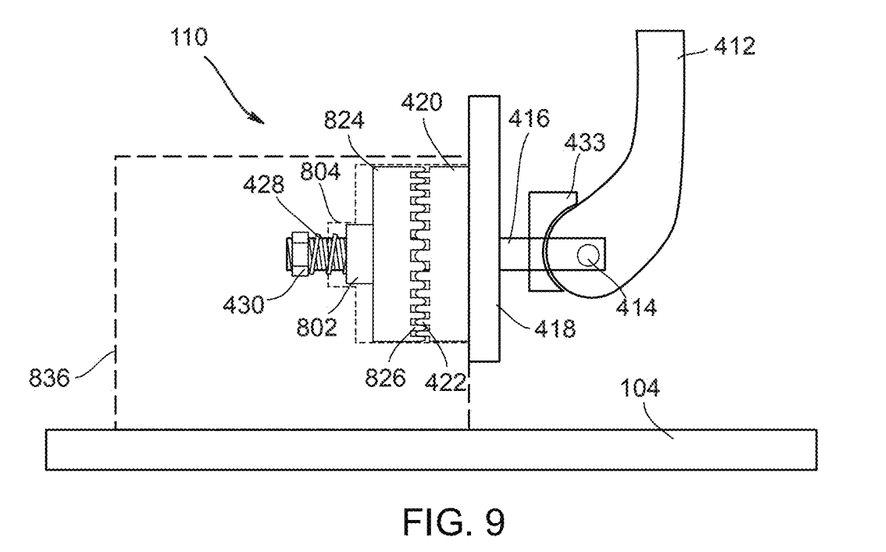
FIG. 9 presents a schematic view of the latching hinge of FIG. 8 in a second, locked, position.

FIG. 9 presents a schematic view of the latching hinge 810 of FIG. 8 in a second, locked, position. In the configuration shown in FIG. 9, the latch lever 412 is in a position where the shaft 416 is pulled to the right, towards the latch lever seat 433 and the latch lever 412. As the shaft 416 moves to the right, the separation spring 434 (not shown in FIG. 9) is compressed and the teeth 826 move to engage the teeth 422 and prevent relative rotation between the first and second toothed locking plates 424 and 420. The bar 802 remains partially engaged in the slot 804 and prevents rotation of the first toothed locking plate 824 relative to the latching hinge moulding 836. Because the bar 802 prevents the first toothed locking plate 824 from rotating relative to the latching hinge moulding 836, the engagement of the teeth 826 with the teeth 422 prevents rotation of the display panel arm 418 (and the display panel 102) relative to the control panel 104.

While only some embodiments of the disclosure have been described herein, those skilled in the art, having benefit of this disclosure, will appreciate that other embodiments may be devised which do not depart from the scope of the disclosure herein. While the disclosure has been described in detail, it should be understood that various changes, substitutions, and alterations can be made hereto without departing from the spirit and scope of the disclosure.

What is claimed is:

1. A display hinge system comprising a latching hinge and a friction hinge, the display hinge system configured to rotatably couple a display panel to a control panel, wherein:
   the latching hinge comprises:
      a latching hinge moulding fixedly coupled to the control panel;
      a first toothed locking plate translatably and non-rotatably mounted to the latching hinge moulding;
      a second toothed locking plate fixedly coupled to the display panel; and
      a latch lever mechanism mechanically coupled to the first toothed locking plate and configured to move the first toothed locking plate toward and away from the second toothed locking plate, wherein:
         in a first configuration of the latch lever mechanism, teeth of the first toothed locking plate do not engage the teeth of the second toothed locking plate and the display panel is free to rotate relative to the control panel; and
         in a second configuration of the latch lever mechanism, the teeth of the first toothed locking plate engage the teeth of the second toothed locking plate and prevent the display panel from rotating relative to the control panel; and
   the friction hinge comprises:
      a friction hinge moulding fixedly coupled to the control panel;
      a friction hinge cap fixedly coupled to the display panel; and
      a torque hinge having a first part and a second part, wherein the first part is mechanically coupled to the friction hinge moulding and the second part is mechanically coupled to the friction hinge cap, wherein the friction hinge is configured to resist rotation of the display panel relative to the control panel.

2. The display hinge system of claim 1, wherein:
   the torque hinge is configured as a cylinder,
   the first part comprises a first end of the cylinder, and the second part comprises a second, opposite end of the cylinder.

3. The display hinge system of claim 2, wherein the first part is prevented from rotating relative to the friction hinge moulding by a first radial extension from the first part, wherein the first radial extension is constrained within a recess in the friction hinge moulding; and the second part is prevented from rotating relative to the friction hinge cap by a second radial extension from the second part, wherein the second radial extension is constrained within a recess in the friction hinge cap.

4. The display hinge system of claim 1, wherein a separation spring is positioned between the first and second toothed locking plates and configured to bias the first and second toothed locking plates apart.

5. The display hinge system of claim 1, wherein the latch lever mechanism comprises an override spring coupled to the latch lever mechanism and the first toothed locking plate and configured to bias the first toothed locking plate toward the second toothed locking plate.

6. The display hinge system of claim 5, wherein one or both of the first and second toothed locking plates comprise teeth configured to convert a rotational torque, applied to rotate the first and second toothed locking plates relative to each other, into an axial force in a direction that compresses the override spring and causes the first toothed locking plate to move away from the second toothed locking plate.

7. The display hinge system of claim 1, wherein the latch lever mechanism comprises:
a shaft configured to move the first toothed locking plate toward and away from the second toothed locking plate;
a latch lever seat fixedly coupled to the display panel comprising a curved seat surface; and
a latch lever, rotatably coupled to the shaft by a hinge pin, the latch lever comprising a curved portion configured to mate with the curved seat surface,
wherein the hinge pin is located in a position in the latch lever relative to the curved portion configured to cause the hinge pin to move relative to the latch lever seat coaxially along a long axis of the shaft, thereby moving the first toothed locking plate toward and away from the second toothed locking plate.

8. The display hinge system of claim 1, wherein:
the first toothed locking plate comprises a bar;
the latching hinge moulding comprises a slot configured to receive the bar; and
the bar and the slot are configured to prevent rotation of the first toothed locking plate relative to the latching hinge moulding when the bar is engaged in the slot.

9. The display hinge system of claim 1, wherein:
the latching hinge further comprises a pin fixedly coupled to the latching hinge moulding;
the first toothed locking plate comprises a clearance aperture configured to receive the pin; and
the pin and the clearance aperture are configured to prevent rotation of the first toothed locking plate relative to the latching hinge moulding.

10. A lighting console comprising a control panel and a display panel, wherein the display panel is rotatably coupled to the control panel by a display hinge system comprising a latching hinge and a friction hinge, wherein:
the latching hinge comprises:
a latching hinge moulding fixedly coupled to the control panel;
a first toothed locking plate translatably and non-rotatably mounted to the latching hinge moulding;
a second toothed locking plate fixedly coupled to the display panel; and
a latch lever mechanism mechanically coupled to the first toothed locking plate and configured to move the first toothed locking plate toward and away from the second toothed locking plate, wherein:
in a first configuration of the latch lever mechanism, teeth of the first toothed locking plate do not engage the teeth of the second toothed locking plate and the display panel is free to rotate relative to the control panel; and
in a second configuration of the latch lever mechanism, the teeth of the first toothed locking plate engage the teeth of the second toothed locking plate and prevent the display panel from rotating relative to the control panel; and
the friction hinge comprises:
a friction hinge moulding fixedly coupled to the control panel;
a friction hinge cap fixedly coupled to the display panel; and
a torque hinge having a first part and a second part, wherein the first part is mechanically coupled to the friction hinge moulding and the second part is mechanically coupled to the friction hinge cap,
wherein the friction hinge is configured to resist rotation of the display panel.

11. The lighting console of claim 10, wherein:
the torque hinge is configured as a cylinder,
the first part comprises a first end of the cylinder, and
the second part comprises a second, opposite end of the cylinder.

12. The lighting console of claim 11, wherein the first part is prevented from rotating relative to the friction hinge moulding by a first radial extension from the first part, wherein the first radial extension is constrained within a recess in the friction hinge moulding; and
the second part is prevented from rotating relative to the friction hinge cap by a second radial extension from the second part, wherein the second radial extension is constrained within a recess in the friction hinge cap.

13. The lighting console of claim 10, wherein a separation spring is positioned between the first and second toothed locking plates and configured to bias the first and second toothed locking plates apart.

14. The lighting console of claim 10, wherein the latch lever mechanism comprises an override spring coupled to the latch lever mechanism and the first toothed locking plate and configured to bias the first toothed locking plate toward the second toothed locking plate.

15. The lighting console of claim 14, wherein one or both of the first and second toothed locking plates comprise teeth configured to convert a rotational torque, applied to rotate the first and second toothed locking plates relative to each other, into an axial force in a direction that compresses the override spring and causes the first toothed locking plate to move away from the second toothed locking plate.

16. The lighting console of claim 10, wherein the latch lever mechanism comprises:
a shaft configured to move the first toothed locking plate toward and away from the second toothed locking plate;
a latch lever seat fixedly coupled to the display panel comprising a curved seat surface; and
a latch lever, rotatably coupled to the shaft by a hinge pin, the latch lever comprising a curved portion configured to mate with the curved seat surface, wherein the hinge pin is located in a position in the latch lever relative to the curved portion configured to cause the hinge pin to move relative to the latch lever seat coaxially along a long axis of the shaft, thereby moving the first toothed locking plate toward and away from the second toothed locking plate.

17. The lighting console of claim 10, wherein:

the first toothed locking plate comprises a bar;

the latching hinge moulding comprises a slot configured to receive the bar; and the bar and the slot are configured to prevent rotation of the first toothed locking plate relative to the latching hinge moulding when the bar is engaged in the slot.

18. The lighting console of claim 10, wherein:

the latching hinge further comprises a pin fixedly coupled to the latching hinge moulding;

the first toothed locking plate comprises a clearance aperture configured to receive the pin; and the pin and the clearance aperture are configured to prevent rotation of the first toothed locking plate relative to the latching hinge moulding.

* * * * *